United States Patent [19]

Penny et al.

[11] 4,425,242

[45] Jan. 10, 1984

[54] METHODS OF INCREASING HYDROCARBON PRODUCTION FROM SUBTERRANEAN FORMATIONS

[75] Inventors: Glenn S. Penny; James E. Briscoe, both of Duncan, Okla.

[73] Assignee: Halliburton Company, Duncan, Okla.

[21] Appl. No.: 355,660

[22] Filed: Mar. 8, 1982

[51] Int. Cl.³ .................... E21B 43/25; E21B 43/16
[52] U.S. Cl. ...................... 252/8.55 R; 252/8.55 D; 166/305 R; 166/308
[58] Field of Search ............... 252/8.55 R, 8.55 B, 252/307, 8.55 D; 134/22.18; 166/305 R, 308

[56] References Cited

U.S. PATENT DOCUMENTS

| | | | |
|---|---|---|---|
| 3,083,224 | 3/1963 | Brace et al. | 260/461 |
| 4,165,338 | 8/1979 | Katsushima et al. | 564/285 |
| 4,288,334 | 9/1981 | McCoy et al. | 252/8.55 D |
| 4,293,441 | 10/1981 | Newell et al. | 252/389 A |
| 4,301,868 | 11/1981 | Scherubel et al. | 252/8.55 R |

OTHER PUBLICATIONS

Clark, et al. 1979, The Use of Fluorochemical Surfactants in Non-aqueous Stimulation Fluids, SPE Paper #7894.
American Institute of Mining, Metallurgical, and Petroleum Engineers, Inc.

Primary Examiner—Herbert B. Guynn
Assistant Examiner—Howard J. Locker
Attorney, Agent, or Firm—Robert A. Kent; Thomas R. Weaver

[57] ABSTRACT

Methods of increasing hydrocarbon production from subterranean hydrocarbon-containing formations are provided wherein the formations are contacted with cationic perfluoro compounds represented by the following formula:

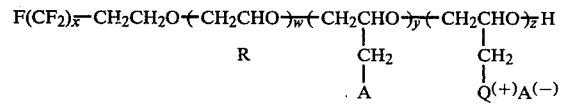

Such perfluoro compounds are adsorbed onto surfaces of the formation and prevent or substantially reduce wetting of the surfaces.

22 Claims, No Drawings

METHODS OF INCREASING HYDROCARBON PRODUCTION FROM SUBTERRANEAN FORMATIONS

Various procedures have been developed and utilized heretofore to increase the flow of hydrocarbons from hydrocarbon-containing subterranean formations penetrated by well bores. For example, a commonly used production stimulation technique involves creating and extending fractures in the subterranean formation to provide flow channels therein through which hydrocarbons flow from the formation to the well bore. The fractures are created by introducing a fracturing fluid into the formation at a flow rate which exerts a sufficient pressure on the formation to create and extend fractures therein. Solid fracture proppant materials, such as sand, are commonly suspended in the fracturing fluid so that upon introducing the fracturing fluid into the formation and creating and extending fractures therein, the proppant material is carried into the fractures and deposited therein whereby the fractures are prevented from closing due to subterranean forces when the introduction of the fracturing fluid has ceased.

In such formation fracturing and other production stimulation procedures, it is important to leave the formation with maximum permeability or conductivity whereby hydrocarbons contained in the formation flow to the well bore with the least possible restriction. In order to achieve maximum conductivity of hydrocarbons from subterranean formations, whether or not such formations have been fractured or otherwise stimulated, it has heretofore been the practice to cause the formation surfaces to be water wet. Such water wetting has been shown to provide an improved flow of hydrocarbons through flow channels and capillaries in the magnitude of about three times greater than when the formation surfaces are hydrocarbon wet.

The water wetting of solid surfaces in subterranean hydrocarbon-containing formations as well as the surfaces of solid proppant material deposited therein has heretofore been accomplished using surfactants whereby a layer of water or water and surfactant is spread over the solid surfaces. Such layers of water or water and surfactant are extremely viscous near the interface of the layer and the solid surface, and while the layer provides a slippage or lubricating effect at the interface thereof with hydrocarbons which decreases the resistance to flow, the layer reduces the effective diameter of capillaries and flow channels. This reduction of effective diameter resticts fluid flow, and in very small capillaries or flow channels becomes significant, i.e., when the capillary radius is equal to the viscous wetting layer thickness, the flow of hydrocarbons is blocked by the layer.

By the present invention, methods are provided whereby certain compounds are caused to be adsorbed onto solid surfaces in subterranean hydrocarbon-containing formations in a very thin layer, i.e., a layer which is preferably one molecule thick and significantly thinner than a layer of water or a water-surfactant mixture. The compounds so adsorbed on the surfaces resist or substantially reduce the wetting of the surfaces by water and hydrocarbons and provide high interfacial tensions between the surfaces and water and hydrocarbons which allows slippage of hydrocarbons at the hydrocarbon-surface interface and significantly increases the flow of hydrocarbons through capillaries or flow channels in the formations.

The compounds which are utilized in accordance with the methods of this invention to prevent solid surfaces from becoming water or hydrocarbon wet while not creating significantly thick and/or viscous layers thereon are certain cationic perfluoro compounds and mixtures of such compounds represented by the formula:

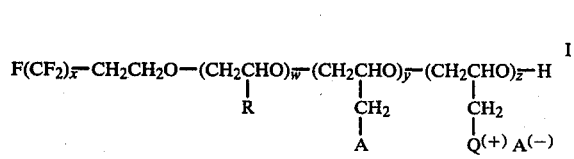

wherein x is an integer from 2–12 or an integer or fractional integer representing an average value of from 2–12; w and y are both individually integers from 0–20 or are integers or fractional integers representing average values of from 0–20; z is an integer of from 0–20 or an integer or fractional integer representing an average value of from 0–20, the sum of y and z being from 1–20; R is a hydrogen, methyl, ethyl or propyl radical, or mixtures thereof; A is a halogen chosen from the group consisting of chlorine, bromine or iodine and may be present as either a halo radical bonded to carbon or as an anion; and Q is a cationic nitrogen-containing radical from the group consisting of:

(i) an aromatic or heterocyclic amino radical formed from the following compounds: 2-H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4-H-carbazole, carbazole, β-carboline, phenanthridine, acridine, phenathroline, phenazine, imidazolidine, phenoxazine, cinnoline, pyrrolidine, pyrroline, imidazoline, piperidine, piperazine, indoline, isoindoline, quinuclindine, morpholine, azocine, azepine, 2H-azepine, 1,3,5-triazine, thiazole, pteridine, dihydroquinoline, hexa methylene imine, indazole; and (ii) an amine radical represented by the formula:

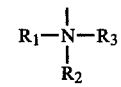

wherein $R_1$, $R_2$ and $R_3$ are from the group consisting of aliphatic hydrocarbon radicals containing from 1–30 carbon atoms, aromatic hydrocarbon radicals such as phenyl and any alkyl substituted phenyl radical, and hydrogen radicals, provided that at least one of $R_1$, $R_2$ and $R_3$ is an aliphatic hydrocarbon radical containing from 1–30 carbon atoms or an aromatic hydrocarbon, and that when any one of the $R_1$, $R_2$ and $R_3$ radicals contains more than 4 aliphatic carbon atoms or an aromatic hydrocarbon, the other two radicals are each chosen from the group consisting of hydrogen, methyl, and ethyl radicals.

In the above formula x is preferably an integer of from 4–10 or an integer or fractional integer representing an average value of from 4–10; w is preferably an integer of from 0–12 or is an integer or fractional integer representing an average value of from 0–12; y is preferably 0; z is preferably an integer of from 1–8 or an integer or fractional integer representing an average value of from 1–8; R is preferably chosen from the group consisting of hydrogen and methyl radicals, or mixtures thereof; A is preferably chlorine; and Q is preferably chosen from the group of cationic nitrogen-containing radicals formed by reacting trimethylamine, pyridine, quinoline, isoquinoline, N,N-dimethyl aniline, N-methyl morpholine, or morpholine with a chloro radical functional group.

Most preferably, in the above formula x is an integer of from 6–8 or an integer or fractional integer representing an average value of from 6–8; w is an integer of from 0–8 or an integer or fractional integer representing an average value of from 0–8; y is 0; z is an integer of from 1–4 or an integer or fractional integer representing an average value of from 1–4; R is from the group of hydrogen radicals and methyl radicals and/or mixtures thereof; A is chlorine; and Q is from the group of cationic nitrogen-containing radical formed by reaction of trimethylamine, pyridine, quinoline, morpholine, and isoquinoline with a pendent chloro radical.

The term "integer or fractional integer representing an average value" indicates that the formula may represent an admixture of compounds wherein the average values of x, w, y and z can be any integer in the range given such as 8 or a fractional integer such as 7.5, 7.8, 8.5 and the like.

A preferred group of nitrogen-containing cationic perfluoronated compounds for use in accordance with the methods of this invention is represented by the following formula:

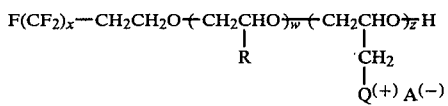

II wherein x is an integer from 2–12 or an integer or fractional integer representing an average value of from 2–12; w is an integer from 1–20 or an integer or fractional integer representing an average value of from 1–20; z is an integer from 1–20 or a fractional integer representing an average value of from 1–20; R is from the group of hydrogen, methyl, ethyl, propyl radicals and mixtures thereof; A is a halogen anion from the group consisting of chlorine, bromine and iodine; and Q is a cationic nitrogen radical from the group consisting of an aromatic amino radical, a heterocyclic amino radical, and an amine radical represented by the formula:

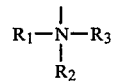

wherein: $R_1$, $R_2$ and $R_3$ are from the group consisting of hydrocarbon radicals containing from 1–30 carbon atoms, aromatic hydrocarbon radicals such as phenyl and any alkyl substituted phenyl radical, and hydrogen radicals, provided that at least one of $R_1$, $R_2$ and $R_3$ is an aliphatic hydrocarbon radical containing from 1–30 carbon atoms or an aromatic hydrocarbon and that when any one of $R_1$, $R_2$ and $R_3$ radicals contains more than 4 aliphatic carbon atoms or an aromatic hydrocarbon, the other two radicals are each chosen from the group consisting of hydrogen, methyl, and ethyl radicals.

Of this group of compounds, when Q is an aromatic/heterocyclic amino radical, the most preferred compounds are those wherein x is an integer representing an average value of 8; w is an integer or fractional integer representing an average value of from 6–10; z is an integer or fractional integer representing an average value of from 1–3; R is methyl; and Q is a pyridino or quinolino radical.

When Q is an amine radical, the most preferred compounds are those wherein x is an integer representing an average value of 8; w is an integer or fractional integer representing an average value of from 6–8; z is an integer or fractional integer representing an average value of from 1–3; R is methyl; $R_1$, $R_2$ and $R_3$ are all methyl and A is chlorine.

Another preferred group of compounds are represented by the formula:

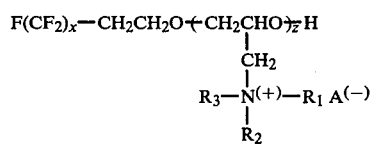

III wherein x is an integer from 2–12 or an integer or fractional integer representing an average value of from 2–12; z is an integer from 1–20 or an integer or fractional integer representing an average value of from 1–20; $R_1$, $R_2$ and $R_3$ are each chosen from the group consisting of lower aliphatic hydrocarbon radicals containing from 1–4 carbon atoms; and A is a halogen anion chosen from the group consisting of chlorine, bromine and iodine.

Of this group of compounds, the most preferred is where x is an integer representing an average value of 8; z is an integer or fractional integer representing an average value of from 1–3; $R_1$, $R_2$ and $R_3$ are all methyl and A is chlorine.

Yet another preferred group of compounds for use in accordance with the methods of the present invention are represented by the formula:

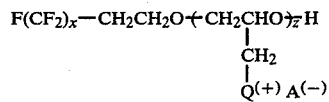

IV wherein x is an integer from 2–12 or an integer or fractional integer representing an average value of from 2–12; z is an integer from 1–20 or an integer or fractional integer representing an average value of from 1–20; Q is a nitrogen-containing heterocyclic/aromatic cationic radical; and A is a halogen anion chosen from chlorine, bromine, and iodine anions.

Of this group of compounds, the most preferred is where x is an integer representing an average value of 8; z is an integer representing an average value of from 1–3; Q is a pyridino or quinolino radical; and A is chlorine.

The most preferred compounds for use in accordance with the present invention are those represented by Formula II above wherein x is an integer representing an average value of 8; w is an integer or fractional integer representing an average value of from 6–8; z is an integer or fractional integer representing an average value of 1-3; Q is an amine radical wherein $R_1$, $R_2$ and $R_3$ are all methyl; and A is chlorine.

In carrying out the methods of the present invention, the cationic perfluoro compound or compounds can be applied directly to a subterranean formation whereby the surfaces thereof are contacted by the compounds and adsorbed thereon. Preferably, the cationic perfluoro compound or compounds utilized are dissolved or dispersed in a carrier fluid which is in turn introduced into the formation whereby the carried cationic perfluoro compounds are distributed in the formation and contact solid surfaces therein whereby they are adsorbed thereon. Aqueous or hydrocarbon base carrier fluids can be utilized in the form of liquids, foams, emulsions, etc. The particular quantity of perfluoro compounds combined with the carrier fluid can vary widely depending upon the type of formation to be treated and other factors, but generally the cationic perfluoro compounds utilized are combined with the carrier fluid in an amount in the range of from about 0.01% to about 10% by weight of the carrier fluid.

In carrying out subterranean formation fracturing processes wherein a fracturing fluid is introduced into a subterranean formation at a rate such that fractures are created in the formation and extended therein, the cationic perfluoro compound or compounds utilized are conveniently combined with the fracturing fluid prior to introducing it into the formation.

In the usual case, a non-viscous perflush solution is injected into the formation, followed by a viscous fracturing fluid without proppant material which is in turn followed by a viscous fracturing fluid carrying solid proppant material, such as sand, bauxite or glass beads. The fracturing fluids create and extend fractures in the formation and the solid proppant material is carried into and deposited in the fractures. In carrying out such fracturing procedures in accordance with this invention, the cationic perfluoro compound or compounds utilized can be dissolved or dispersed in the non-viscous preflush solution as well as the viscous fracturing fluids in any convenient manner. In addition, the proppant material can be pretreated with the compounds. Upon introducing the preflush and fracturing fluids into the subterranean formation, the cationic perfluoro compounds are adsorbed on the solid surfaces of the formation. Thus, both the surfaces of the formation and the surfaces of the proppant material have cationic perfluoro compounds adsorbed thereon whereby such surfaces are substantially prevented from being wetted by water or hydrocarbons and the flow of hydrocarbons through the formation and proppant material is significantly increased.

In subterranean formation fracturing procedures, the cationic perfluoro compounds are combined with the fluids introduced into the formation in a sufficient quantity whereby the compounds are adsorbed on the proppant material used (if not pretreated) and are distributed over and absorbed on the surfaces of the formation being fractured. This quantity can vary depending upon the type of formation and the quantity of proppant material utilized, but generally is in the range of from about 0.01% to about 10% by weight of the fracturing fluid and proppant material used. In order to improve the distribution of the cationic perfluoro compounds over the formation surfaces and when aqueous fluids are used, various lower alcohols such as methanol or isopropanol can be added to the fluids or the pH of the fluids can be controlled.

In order to facilitate a clear understanding of the methods of the present invention, the following examples are given.

EXAMPLE 1

Various cationic perfluoro compounds of structural formula II above are tested to determine their effectiveness in producing a non-wetting surface.

TEST PROCEDURE 40-60 Ottawa (from Minnesota) sand is sieved 3 times through a 50 mesh screen. The sieved sand (93 g) is placed in 300 ml of methanol containing 0.01% by weight of the cationic perfluoro compounds to be tested. The slurry is stirred vigorously to insure complete solution sand contact, and the methanol is evaporated. The treated sand is cooled to room temperature and then placed in a horizontally positioned 1½" I.D.×12" cylindrical polypropylene tubing. The ends of the packed column are stoppered with a 1½" diameter 60 mesh screen and a number 0 stopper with a 9 mm hole. The column fluid entry point is equipped with a piece of 'Y' shaped 9 mm tubing with a stopcock on each arm of the 'Y'; one arm leads to the column; the other two arms lead to 500 ml water and oil reservoirs, which are placed 18" above the horizontal column to provide a constant head. The fluid exit point of the column is equipped with a 3 inch, 120° elbow fashioned from 9 mm glass tubing. A 1" piece of 5 mm glass rod is annealed to the bend point of the elbow to direct flowing fluid into collecting vessel. The elbow is pointed upward in order to maintain a constant, maximum fluid volume (no air entrapment).

Distilled water is flowed through the column for 10 minutes (~5 column volumes), followed immediately by Phillips Soltrol 160 (a refined aliphatic oil). The time for the oil to displace the water is noted, and the flow rate of the oil is measured (from the time of the first collected drop) for 10 minutes. Each test is run in duplicate or triplicate.

The results of these tests are shown in Table I below.

TABLE I

EFFECTIVENESS OF CATIONIC PERFLUORO COMPOUNDS IN PRODUCING NON-WETTING SAND SURFACES

| Cationic Perfluoro Compounds Tested (Structural Formula II above) | | | | | | Average[1] Flow Rate of Soltrol 160 Following Water |
|---|---|---|---|---|---|---|
| x | w | R | z | A | Q | (ml/min.) |
| 8 | 0 | — | 1.5 | Cl | pyridine | 4.0 |
| 8 | 0 | — | 3.0 | Cl | pyridine | 3.5 |
| 8 | 0 | — | 3.0 | Cl | quinoline | 3.2 |
| 8 | 0 | — | 1.5 | Cl | trimethylamine | 3.8 |
| 8 | 0 | — | 2.0 | Cl | trimethylamine | 3.6 |
| 8 | 0 | — | 3.0 | Cl | trimethylamine | 3.5 |
| 8 | 2 | —CH$_3$ | 1.5 | Cl | trimethylamine | 3.8 |
| 8 | 2 | —CH$_3$ | 2.0 | Cl | trimethylamine | 3.6 |
| 8 | 4 | —CH$_3$ | 1.5 | Cl | trimethylamine | 4.0 |
| 8 | 6 | —CH$_3$ | 1.5 | Cl | trimethylamine | 4.3 |
| 8 | 8 | —CH$_3$ | 1.5 | Cl | trimethylamine | 4.5 |
| 8 | 12 | —CH$_3$ | 1.5 | Cl | trimethylamine | 3.8 |
| 8 | 6 | H | 1.5 | Cl | pyridine | 2.3 |
| 8 | 6 | H | 1.5 | Cl | pyridine | 1.7 |

[1]Variation between flow rates of duplicate runs averaged 5%

In runs of oil following water on untreated sand, no flow of oil is detected for 15 minutes and only 2 ml of oil are collected within 1 hour. In runs in which the sand is treated with cationic perfluoro compounds (Table I above), the time required to displace the water in the sand pack is less than 4 minutes, and subsequent oil flow rates are in the range of 2-5 ml/min., depending on the particular structure of the cationic perfluoro compound. The greater the sustained flow rate of oil following water the more pronounced is the non-wetting effect of the sample.

EXAMPLE 2

The procedure of Example 1 is repeated using cationic perfluoro compounds and several conventional hydrocarbon surfactants. The results of these tests are given in Table II below.

TABLE II
COMPARISON OF NON-WETTING BROUGHT ABOUT BY VARIOUS SURFACTANTS

| Quantity of Surfactant | Surfactant Used | Relative % Flow Rate of Oil Achieved |
|---|---|---|
| 0.01% by Weight | Cationic perfluoro compounds (Structural Formula II, $x = 8$, $w = 8$, $R = CH_3$, $z = 1.5$, $A = Cl$, $Q = $ trimethylamine) | 100% |
| 0.5% by Volume | $NH_4$ Salt of Sulfated, ethoxylated $C_{12-14}$ Alcohol[1] | 0.74% |
| 0.5% by Volume | $C_{12-16}$ trialkyl ammonium chloride formulation[1] | 4.2% |
| 0.5% by Volume | $NH_4$ Salt of $C_{12}$ diphenylether sulfonate formulation[1] | 42% |

[1]Added to water phase

From Table II it can be seen that the cationic perfluoro compounds are much more effective in preventing the wetting of solid surfaces than conventional hydrocarbon surfactants.

We claim:

1. A method of increasing the production of hydrocarbons from a hydrocarbon-containing subterranean formation to reduce wetting of said surfaces by hydrocarbons and water, comprising contacting said formation with a cationic perfluoro compound whereby said compound is adsorbed onto surfaces of said formation said cationic perfluoro compound being selected from the group consisting of a compound or mixtures of compounds represented by the formula:

$$F(CF_2)_x\text{—}CH_2CH_2O\text{—}(CH_2CHO)_w\text{—}(CH_2CHO)_y\text{—}(CH_2CHO)_z H$$
$$\underset{R}{|} \quad \underset{\underset{A}{|}}{\overset{|}{CH_2}} \quad \underset{\underset{Q^{(+)}A^{(-)}}{|}}{\overset{|}{CH_2}}$$

wherein:
x is an integer from 2-12 or an integer or fractional integer representing an average value of from 2-12;
w and y are both individually integers from 0-20 or integers or fractional integers representing average values of from 0-20,
z is an integer from 0-20 or an integer or fractional integer representing an average value of from 0-20, the sum of y and z being from 1-20;
R is a hydrogen, methyl, ethyl or propyl radical, or mixtures thereof;
A is a halogen chosen from chlorine, bromine or iodine; and
Q is a cationic nitrogen radical from the group consisting of an aromatic amino radical, a heterocyclic amino radical, and an amine radical represented by the formula:

$$R_1\text{—}\underset{\underset{R_2}{|}}{\overset{|}{N}}\text{—}R_3$$

wherein: $R_1$, $R_2$ and $R_3$ are from the group consisting of hydrocarbon radicals containing from 1-30 carbon atoms, aromatic hydrocarbon radicals such as phenyl and any alkyl substituted phenyl radical, and hydrogen radicals, provided that at least one of $R_1$, $R_2$ and $R_3$ is an aliphatic hydrocarbon radical containing from 1-30 carbon atoms or an aromatic hydrocarbon and that when any one of $R_1$, $R_2$ and $R_3$ radicals contains more than 4 aliphatic carbon atoms or an aromatic hydrocarbon, the other two radicals are each chosen from the group consisting of hydrogen, methyl, and ethyl radicals.

2. The method of claim 1 wherein said contacting of said formation with said cationic perfluoro compound or compounds is brought about by dissolving or dispersing said compound or compounds in a carrier fluid and introducing said carrier fluid into said formation.

3. The method of claim 1 wherein:
x is from 4-10;
w is from 0-12;
y is 0;
z is from 1-8;
R is from the group of hydrogen and methyl radicals, and mixtures thereof;
A is chlorine; and
Q is selected from the group of trimethylamino, pyridino, quinolino, isoquinolino, N,N dimethyl anilino, N-methyl morpholino, and morpholino radicals.

4. The method of claim 1 wherein said cationic perfluoro compound is selected from the group consisting of a compound or mixture of compounds represented by the formula:

$$F(CF_2)_x\text{—}CH_2CH_2O\text{—}(CH_2CHO)_w\text{—}(CH_2CHO)_z H$$
$$\underset{R}{|} \quad \underset{\underset{Q^{(+)}A^{(-)}}{|}}{\overset{|}{CH_2}}$$

wherein:
x is an integer from 2-12 or an integer or fractional integer of from 2-12;
w is an integer from 1-20 or an integer or fractional integer of from 1-20;
z is an integer from 1-20 or an integer or fractional integer of from 1-20;
R is selected from the group of hydrogen, methyl, ethyl, propyl radicals and mixtures thereof;
A is a halogen anion from the group consisting of chlorine, bromine and iodine; and
Q is a cationic nitrogen radical from the group consisting of:
an aromatic amino radical;
a heterocyclic amino radical; and
an amine radical represented by the formula:

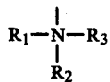

wherein: $R_1$, $R_2$ and $R_3$ are from the group consisting of hydrocarbon radicals containing from 1–30 carbon atoms, aromatic hydrocarbon radicals such as phenyl and any alkyl substituted phenyl radical, and hydrogen radicals, provided that at least one of $R_1$, $R_2$ and $R_3$ is an aliphatic radical containing from 1–30 carbon atoms or an aromatic hydrocarbon and that when any one of $R_1$, $R_2$ and $R_3$ radicals contains more than 4 aliphatic carbon atoms or an aromatic hydrocarbon, the other two radicals are each chosen from the group consisting of hydrogen, methyl, and ethyl radicals.

5. The method of claim 4 wherein:
x is 8;
w is from 6–10;
z is from 1–3;
R is a methyl radical;
A is chlorine; and
Q is a cationic nitrogen radical selected from the group consisting of pyridino, and quinolino.

6. The method of claim 4 wherein:
x is 8;
w is from 6–8;
z is from 1–3;
A is chlorine; and
Q is a trimethylamino radical.

7. The method of claim 1 wherein said cationic perfluoro compound is selected from the group consisting of a compound or mixture of compounds represented by the formula:

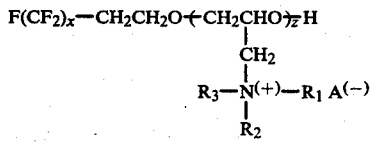

wherein:
x is an integer from 2–12 or an integer or fractional integer representing an average value of from 2–12;
z is an integer of from 1–20 or an integer or fractional integer representing an average value from 1–20;
$R_1$, $R_2$ and $R_3$ are each chosen from the group consisting of lower aliphatic hydrocarbon radicals containing from 1–4 carbon atoms; and
A is a halogen anion chosen from the group consisting of chlorine, bromine and iodine.

8. The method of claim 7 wherein:
x is 8;
z is from 1–3;
$R_1$, $R_2$ and $R_3$ are each methyl radicals; and
A is a chlorine anion.

9. The method of claim 1 wherein said cationic perfluoro compound or compounds are represented by the formula:

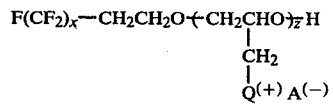

wherein:
x is an integer from 2–12 or an integer or fractional integer representing an average value of from 2–12;
z is an integer of from 1–20 or an integer or fractional integer representing an average value of from 1–20;
Q is a nitrogen-containing heterocyclic or aromatic cationic radical; and
A is a halogen anion chosen from the group of chlorine, bromine and iodine anions.

10. The method of claim 9 wherein:
x is 8;
z is from 1–3;
Q is a cationic nitrogen radical selected from the group consisting of pyridino and quinolino radicals; and
A is a chlorine anion.

11. The method of claim 4 wherein:
x is 8;
w is from 6–8;
z is from 1–3;
Q is a trimethylamino radical; and
A is the chlorine anion.

12. In a method of fracturing a subterranean hydrocarbon containing formation to stimulate the production of hydrocarbons therefrom wherein a fracturing fluid is introduced into said formation in a manner whereby fractures are created therein, the improvement comprising:
combining with said fracturing fluid a cationic perfluoro compound having the property of adsorbing on surfaces of said formation and substantially prereducing the wetting of said surfaces by hydrocarbons and water, said cationic perfluoro compound being selected from the group consisting of a compound or mixture of compounds represented by the formula:

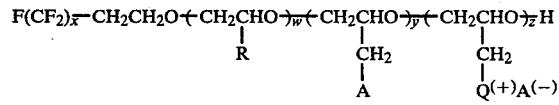

wherein:
x is an integer from 2–12 or an integer or fractional integer representing an average value of 2–12;
w and y are both individually integers from 0–20 or integers or fractional integers representing average values of from 0–20;
z is an integer of from 1–20 or an integer or fractional integer of from 1–20;
R is a hydrogen, methyl, ethyl or propyl radical, or mixtures thereof;
A is a halogen chosen from chlorine, bromine or iodine; and
Q is a cationic nitrogen radical from the group consisting of an aromatic amino radical, a heterocyclic amino radical, and an amine radical represented by the formula:

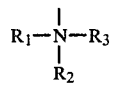

wherein: $R_1$, $R_2$ and $R_3$ are from the group consisting of hydrocarbon radicals containing from 1-30 carbon atoms, aromatic hydrocarbon radicals such as phenyl and any alkyl substituted phenyl radical, and hydrogen radicals, provided that at least one of $R_1$, $R_2$ and $R_3$ is an aliphatic hydrocarbon radical containing from 1-30 carbon atoms or an aromatic hydrocarbon and that when any one of $R_1$, $R_2$ and $R_3$ radicals contains more than 4 aliphatic carbon atoms or an aromatic hydrocarbon, the other two radicals are each chosen from the group consisting of hydrogen, methyl, and ethyl radicals.

13. The method of claim 12 wherein said fracturing fluid is an aqueous fluid.

14. The method of claim 12 wherein said cationic perfluoro compound is combined with said fracturing fluid in an amount in the range of from about 0.01% to about 10% by weight of said fracturing fluid.

15. The method of claim 12 wherein said fracturing fluid is further characterized to include solid fracture proppant materials suspended therein.

16. The method of claim 12 wherein:
x is from 4-10;
w is from 0-12;
y is 0;
z is from 1-8;
R is from the group of hydrogen and methyl radicals, and mixtures thereof;
A is chlorine; and
Q is selected from the group of trimethylamino, pyridino, quinolino, isoquinolino, N, N dimethyl anilino, N-methyl morpholino, and morpholino radicals.

17. The method of claim 12 wherein said cationic perfluoro compound is selected from the group consisting of a compound r mixture of compounds represented by the formula:

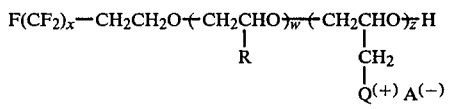

wherein:
x is an integer from 2-12 or an integer or fractional integer representing an average value of from 2-12;
w is an integer from 1-20 or an integer or fractional integer of from 1-20;
z is an integer from 1-20 or an integer or fractional integer of from 1-20;
R is selected from the group of hydrogen, methyl, ethyl, propyl radicals and mixtures thereof;
A is a halogen anion from the group consisting of chlorine, bromine and iodine; and
Q is a cationic nitrogen radical from the group consisting of:
an aromatic amino radical;
a heterocyclic amino radical; and
an amine radical represented by the formula:

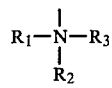

wherein: $R_1$, $R_2$ and $R_3$ are from the group consisting of hydrocarbon radicals containing from 1-30 carbon atoms, aromatic hydrocarbon radicals such as phenyl and any alkyl substituted phenyl radical, and hydrogen radicals, provided that at least one of $R_1$, $R_2$ and $R_3$ is an aliphatic radical containing from 1-30 carbon atoms or an aromatic hydrocarbon and that when any one of $R_1$, $R_2$ and $R_3$ radicals contains more than 4 aliphatic carbon atoms or an aromatic hydrocarbon, the other two radicals are each chosen from the group consisting of hydrogen, methyl, and ethyl radicals.

18. The method of claim 17 wherein:
x is 8;
w is from 6-10;
z is from 1-3;
R is a methyl radical;
A is chlorine; and
Q is a cationic nitrogen radical selected from the group consisting of pyridino, and quinolino.

19. The method of claim 12 wherein said cationic perfluoro compound is selected from the group consisting of a compound or mixture of compounds represented by the formula:

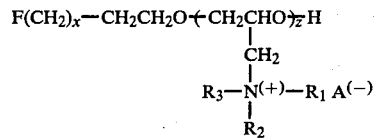

wherein:
x is an integer from 2-12 or an integer or fractional integer representing an average value of from 2-12;
z is an integer of from 1-20 or an integer or fractional integer representing an average value from 1-20;
$R_1$, $R_2$ and $R_3$ are each chosen from the group consisting of lower aliphatic hydrocarbon radicals containing from 1-4 carbon atoms; and
A is a halogen anion chosen from the group consisting of chlorine, bromine and iodine.

20. The method of claim 12 wherein said cationic perfluoro compound or compounds are represented by the formula:

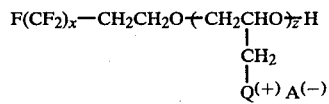

wherein:
x is an integer from 2-12 or an integer or fractional integer representing an average value of from 2-12;
z is an integer from 1-20 or an integer or fractional integer representing an average value of from 1-20;
Q is a nitrogen-containing heterocyclic or aromatic cationic radical; and
A is a halogen anion.

21. The method of claim 20 wherein:

x is 8;
z is from 1–3;
Q is a nitrogen-containing cationic radical selected from the group consisting of pyridino and quinolino radicals; and
A is chosen from chlorine, bromine and iodine anions.

22. The method of claim 17 wherein:
x is 8;
w is from 6–8;
z is from 1–3;
Q is a trimethylamino radical; and
A is the chlorine anion.

* * * * *

UNITED STATES PATENT AND TRADEMARK OFFICE
CERTIFICATE OF CORRECTION

PATENT NO. : 4,425,242

DATED : January 10, 1984

INVENTOR(S) : Penny et al

It is certified that error appears in the above-identified patent and that said Letters Patent is hereby corrected as shown below:

Column 3 at line 20, the word "radical" should read --radicals--.

Column 7 at line 40, in Claim 1 delete [to reduce wetting of said surfaces by hydrocarbons and water,] and at line 43 after the word "formation" insert --to reduce wetting of said surfaces by hydrocarbons and water,--.

Signed and Sealed this

Tenth Day of April 1984

[SEAL]

Attest:

Attesting Officer

GERALD J. MOSSINGHOFF

Commissioner of Patents and Trademarks